(No Model.)
M. S. LE GORE.
COMBINED FLAT AND DUMPING CAR.
No. 532,674. Patented Jan. 15, 1895.
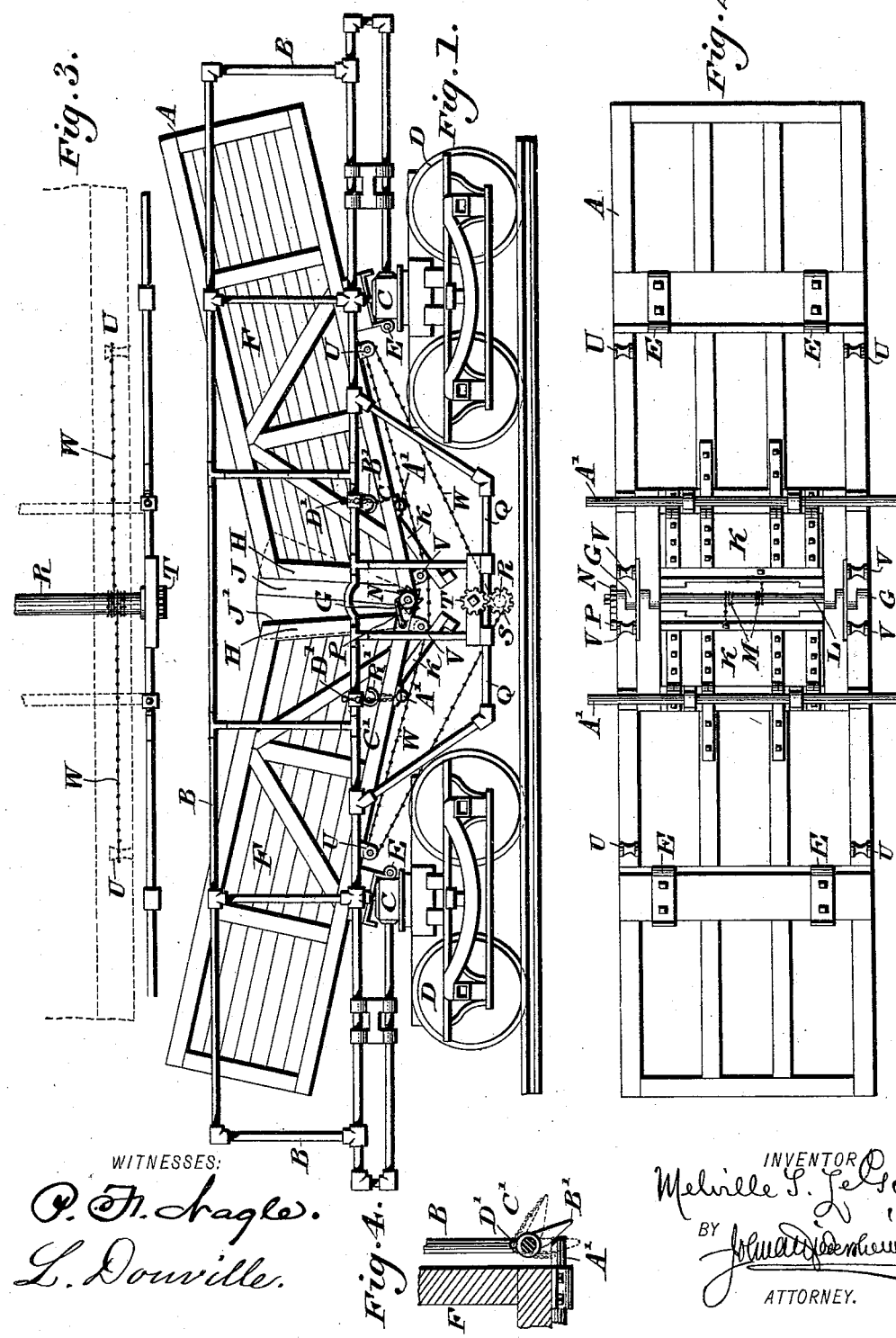
WITNESSES:
P. H. Nagle.
L. Douville.
INVENTOR
Melville S. LeGore
BY 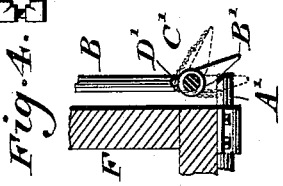
ATTORNEY.

UNITED STATES PATENT OFFICE.

MELVILLE S. LE GORE, OF PHILADELPHIA, ASSIGNOR OF ONE-TENTH TO THOMAS F. McCOY, OF CONSHOHOCKEN, PENNSYLVANIA.

COMBINED FLAT AND DUMPING CAR.

SPECIFICATION forming part of Letters Patent No. 532,674, dated January 15, 1895.

Application filed May 12, 1894. Serial No. 510,993. (No model.)

*To all whom it may concern:*

Be it known that I, MELVILLE S. LE GORE, a citizen of the United States, residing in the city and county of Philadelphia, State of Pennsylvania, have invented a new and useful Improvement in a Combined Flat and Dumping Car, which improvement is fully set forth in the following specification and accompanying drawings.

The object of my invention is to construct a car which may be used either as a flat or platform car, or as a dumping car, the same consisting of a structure formed of two body sections pivoted to each other and hinged to the trucks, to allow for tilting, means for raising and lowering the inner ends of the said sections, and means for opening the bottom thereof, and unloading the contents of the car, all as will be hereinafter set forth.

Figure 1 represents a side elevation of a combined flat and dumping car embodying my invention. Fig. 2 represents a plan view of the bottom thereof, with the trucks, framework, &c., removed. Fig. 3 represents a detail view of a portion of said car. Fig. 4 represents on an enlarged scale, a detail view of mechanism to be hereinafter referred to.

Similar letters of reference indicate corresponding parts in the several figures.

Referring to the drawings: A designates a car having the framework B, which is mounted on the supporting beams C of the trucks D, D, said framework B being made preferably of horizontal and vertical sections of pipe or tubing suitably coupled together, as shown in Fig. 1. Secured by hinges E to said supporting beams C are the body sections F of the said car, whose lower inner extremities are pivoted to each other at G, and whose inner edges H, are inclined upwardly and outwardly from each other, thus leaving a space between. Fastened to the walls of the sections and near the edges H, are the plates J, J', which close said space between the edges H, and one of said plates is adapted to slide behind the other, and has a beveled edge whereby it will push aside any obstacle in its passage.

Suitably hinged to the bottom of the sections F are the doors K, which are connected with a shaft L by chains M, the latter being adapted to be wound and unwound on said shaft L, which is adapted to be turned, and has a ratchet N which is engaged by the dog or pawl P on the exterior of the car, whereby said chains are prevented from unwinding. The shaft L preferably serves as the pivot for the body sections F.

Depending from the frame B is an auxiliary frame Q, which is provided with a suitable bearing for a winding shaft R, the latter having a pinion S attached thereto, and meshing with a toothed wheel T, suitably journaled in the said frame Q, whereby said shaft R can be rotated. Suitably mounted on the bottom of the sections F are the pulleys U, and the rollers V.

W designates chains which are secured to the shaft R, and pass around the pulleys U, and bear against the rollers V, and serve to support the sections F, so that when the chains are loosened, the inner ends of said sections will descend, turning on the hinges E. The said chains in the present instance, are located one under each side of the car, and each is continuous, extending from the shaft R, up around the pulleys and under the rollers back to the shaft again as in Fig. 1.

Fastened to the sections F are the bars A' which extend beyond the sides of the car, and whose ends are beveled and adapted to strike the hooks B' which are pivotally supported on the frame B, and whose inner edges are also beveled so that when the ends of the bars A' strike the said hooks B', the latter are forced aside and then fall back after said bars have passed and engage the same, thus acting as a support for the sections F when the latter are in a horizontal position.

Attached to the hooks B' are the chains C', which are adapted to be engaged by a pin D' on the frame B, and thus hold the hooks out of engagement with the bars A'.

It will be noticed that when the hooks are engaging the bars A', and the sections are in a horizontal position, the floors thereof will be level so that the car can be used as a flat car for any purpose.

The operation of dumping is as follows: The doors K are opened by turning the shaft L, and unwinding the chains M, whereby some of the contents at the center of the car will escape, and thus lighten the load somewhat at that point. The inner ends of the sections F are slightly raised to remove the pressure on the hooks B', which latter are chained out of the way of the bars A'. The shaft R is now caused to revolve and loosens the chains W, whereby the inner ends H of the sections F descend, as there is no support therefor, and the car is rapidly and easily unloaded.

To raise the car, the hooks B' are released. The doors K are closed by winding the chains M on the shaft L. The shaft R is then caused to revolve, so as to tighten the chains W, which raise the sections and in so doing the bars A' strike the hooks B', pushing them outwardly until the bars have passed, when the hooks fall back and engage said bars and act as an additional support for the car.

Having thus described my invention, what I claim as new, and desire to secure by Letters Patent, is—

1. A dumping car having a frame mounted on trucks, two body sections hinged to said trucks at places of support thereon, and pivotally connected with each other, a rotatable shaft mounted on said frame, rollers and pulleys mounted on the under side of each of said sections, and a chain secured at its ends to said shaft and passing around said pulleys and under said rollers, said parts being combined substantially as described.

2. A dumping car having a frame mounted on trucks, two body sections hinged to said trucks, pulleys and rollers mounted on the under side of each of said sections, a rotatable shaft journaled in said frame, and a chain secured at its ends to said shaft and passing around said pulleys and under said rollers, said sections bearing on said chain at said rollers, said parts being combined substantially as described.

3. A dumping car having a frame, two body sections suitably supported, and pivoted to each other, the inner edges of said sections being inclined, plates secured to said sections and adapted to be moved past each other, rollers and pulleys on the bottom of said sections, a shaft suitably journaled on said frame, a pinion on said shaft, a toothed wheel meshing with said pinion and a chain on said shaft adapted to support and actuate said body sections, substantially as described.

4. A dumping car having two body sections pivoted to each other, doors hinged to the bottom of said sections, a shaft acting as the pivot for said sections, and a chain connected with said doors and said shaft, whereby the doors can be actuated, substantially as described.

5. A combined flat and dumping car having a frame, two body sections pivoted to each other, means for raising and lowering said sections, beveled hooks on said frame, adapted to be swung outwardly and bars secured to said sections and adapted to engage said hooks, substantially as described.

6. A dumping car having a frame, two body sections pivoted to each other, doors hinged to the bottom of said sections, a shaft with a chain connected therewith and with the said doors, and a pawl and ratchet device for locking said shaft, substantially as described.

7. A combined flat and dumping car having a frame, two body sections suitably supported and pivoted to each other the inner edges of said sections being inclined, plates secured to said sections, means for raising and lowering the same, doors hinged to the bottoms of said sections, means for raising and lowering the same, and means for supporting said sections substantially as described.

8. A combined flat and dumping car having a frame, two body sections suitably supported and pivoted to each other, the inner edges of said sections being inclined, plates secured to said sections, a shaft mounted in said frame, a chain secured to said shaft, pulleys in said sections around which said chains pass, rollers against which said chains bear, doors on said sections, a shaft with chains secured to said doors, a pawl and ratchet device for locking said shaft, bars secured to said sections, and hooks on said frame adapted to engage said bar, substantially as described.

9. A combined flat and dumping car, comprising two body sections suitably supported and pivoted to each other, a frame B, hooks secured thereto, and adapted to be swung outwardly and be engaged by rods attached to said car bodies when the latter are in horizontal position, a shaft R suitably journaled below said sections and a chain attached thereto and passed under the aforesaid car bodies and adapted to sustain the latter in an inclined position, substantially as described.

10. A combined flat and dumping car, having a frame, two body sections pivoted to each other, means for elevating and lowering said sections, and hooks pivotally mounted on said frame and adapted to be swung outwardly by the contact of bars secured to said sections when the latter are being elevated, said bars and hooks serving to support the aforesaid sections when in horizontal position, substantially as described.

11. A car structure, the bottom of which is made in sections, which are adapted to be a continuity when in a horizontal position, means for sustaining said sections in said position, comprising a frame, hooks pivotally mounted thereon and adapted to be swung outwardly and engaged by bars on the bottom of said sections, the latter being adapted to be also sustained in an inclined position relative to each other, with doors in said bottom and means for actuating the same, substantially as described.

12. A car structure comprising two body sections, suitably supported and pivoted to each other, beveled hooks suitably supported adjacent said car, rods having beveled ends secured to the bottom of said car bodies, and adapted to pass by and engage said hooks when the car is to be used as a flat or platform car, and means for raising and lowering said sections, said parts being combined substantially as described.

13. A dumping car having a frame, two body sections, each hinged to a different truck of the car, a rotatable shaft and a chain secured at its ends to said shaft and passing around pulleys on the under side of said sections, said sections being supported on said chain, said parts being combined substantially as described.

MELVILLE S. LE GORE.

Witnesses:
JOHN A. WIEDERSHEIM,
E. H. FAIRBANKS.